(No Model.)
W. A. HUBENER.
BOTTLE.
No. 563,276. Patented July 7, 1896.
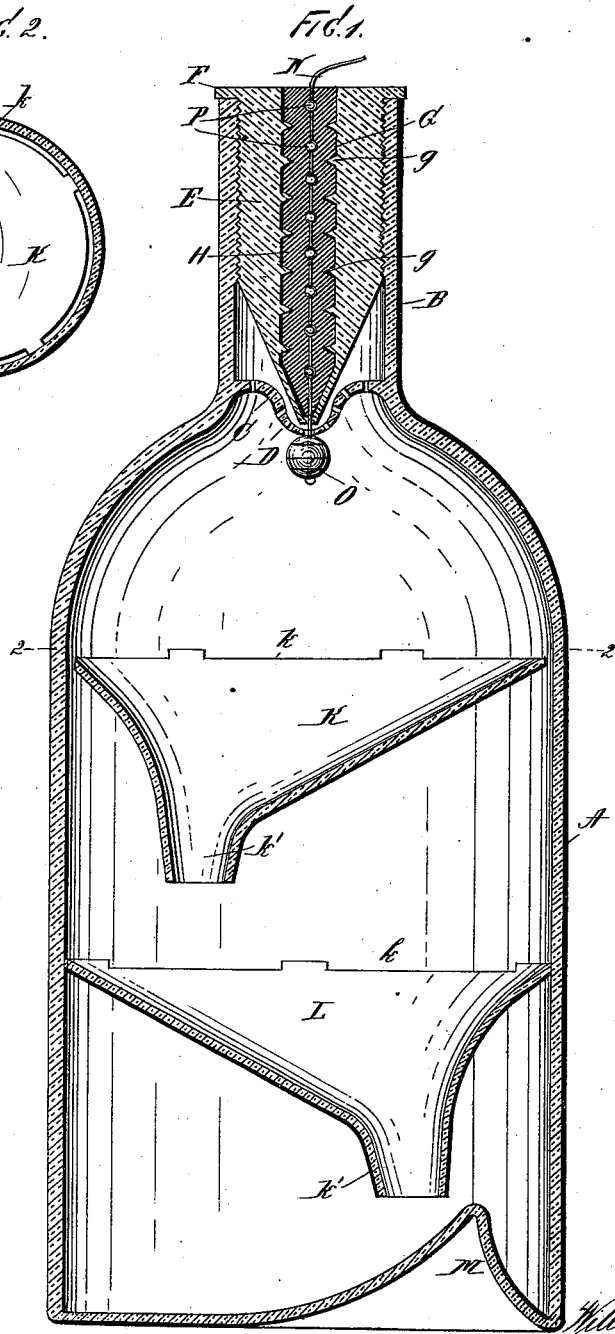
WITNESSES:
John Buckler,
C. Gerst
INVENTOR
William A. Hubener,
BY Edgar Tate & Co
ATTORNEYS.

UNITED STATES PATENT OFFICE.

WILLIAM A. HUBENER, OF WEST HOBOKEN, NEW JERSEY.

BOTTLE.

SPECIFICATION forming part of Letters Patent No. 563,276, dated July 7, 1896.

Application filed October 9, 1895. Serial No. 565,128. (No model.)

*To all whom it may concern:*

Be it known that I, WILLIAM A. HUBENER, a citizen of the United States, and a resident of West Hoboken, in the county of Hudson and State of New Jersey, have invented certain new and useful Improvements in Bottles, of which the following is a specification, reference being had to the accompanying drawings, forming a part thereof, in which similar letters of reference indicate corresponding parts.

This invention relates to bottles, jugs, jars, and similar vessels, and the object thereof is to provide a vessel of this class which, having been once filled, cannot be emptied of its contents without leaving evidence of the fact; and this object I accomplish by means of a neck attachment, which is adapted to be secured in place after the bottle has been filled, and by certain other features of construction hereinafter described and claimed.

The invention is fully disclosed in the following specification, of which the accompanying drawings form a part, in which—

Figure 1 is a central vertical section of my improved bottle, showing the neck attachment in place; and Fig. 2, a transverse section on the line 2 2 and on a reduced scale.

In the practice of my invention I provide a bottle A, which may be of any desired form, and said bottle is provided with a neck B, which is preferably tubular in form, at the bottom of which is formed or placed a perforated partition-plate C, provided with a central downwardly-directed conical portion D, by means of which a cavity is formed in the upper side thereof, which is also conical in form, and the apex of which is directed downward.

The interior walls of the neck B are screw-threaded, and said neck is adapted to receive a correspondingly screw-threaded glass plug or stopper E, provided with a top flange F, which overlaps the neck of the bottle, and said plug or stopper E is provided with a central bore G, on the side walls of which are preferably formed teeth or projections $g$, and said central bore G is adapted to be filled with cement H, which is placed therein while in a plastic condition, or, if preferred, metal may be employed in the place of cement, or combinations of metal, as will be readily understood, the object thereof being hereinafter described.

I also form in the body of the bottle, or secure therein, in any desired manner, a partition K, between which and the walls of the bottle are formed ports or openings $k$, as shown in Fig. 2, and said partition K is irregular in form and provided with a downwardly-directed conical portion $k'$, the lower end of which is open, and below the partition K is placed a similar partition L, at the sides of which are also formed ports or openings $k$, and said partition L is of the same general form as the partition K and provided with a downwardly-directed conical extension $k'$, which is arranged on the side of the bottle opposite to the conical and downwardly-directed extension $k$ of the partition K, and the bottom of the bottle is preferably provided with an inwardly-directed conical portion M, which projects upwardly and inwardly at the side of the extension $k'$ of the partition L and between the same and the side of the bottle adjacent thereto.

Secured to one end of a wire or cord N is a ball or spherical body O, and this ball or spherical body O is preferably composed of a plurality of separate plates or disks, and the wire or cord N is secured to the bottom plate or disk and passed through the others, as shown in Fig. 1, and said ball or spherical body is adapted to be suspended from the plug or stopper E and through a central perforation or opening in the partition D, and, as will be observed, the lower end of the plug or stopper E is conical in form and projects downwardly into the conical depression or cavity formed in said partition, and the wire or cord N is also preferably provided with a number of knots or small bodies formed therein or connected therewith, as shown at P.

The operation will be readily understood from the foregoing description, when taken in connection with the accompanying drawings. In this class of devices the bottle must first be filled before the neck attachment is applied, and the bottle A, having been filled with the required contents, the wire or cord N, connected with the ball or spherical body O, is passed through the opening at the lower end of the conical extension of the plug or stopper E and carried outwardly through the central bore G thereof, and the said plug or stopper is then screwed into position, as shown in Fig. 1, and the wire or cord N is held centrally of the central bore G thereof, and said bore is filled with cement, as hereinbefore described, or with metal in a molten condition, and after said cement is set, or said metal had time to cool, it will be impossible to draw the cord or wire N from the stopper.

Whenever it is desired to empty the bottle or discharge its contents or a portion thereof, the plug or stopper E is removed, and in this operation, as will be readily understood, the ball or spherical body O is broken off, and the separate parts thereof will fall through the partition K and the partition L into the bottom of the bottle, and the construction and arrangement of these partitions, together with the form of the bottom of the bottle, is such that said ball or body or the separate parts thereof cannot be removed from the bottle, and, as will be readily understood, it would be impossible to collect the separate parts of this ball and pass a wire or cord through them and through the partition G, so as to again render the bottle operative, and the presence of the ball or the separate parts thereof within the bottle will be evidence of the fact that the bottle has once been used, and it will thus be seen that I accomplish the object of my invention by means of a device which is simple in construction and operation and perfectly adapted to produce the result for which it is intended.

My invention is not limited to the exact form, construction, and arrangement of parts as shown and described, or to the material of which the various parts thereof are composed; and I therefore reserve the right to make all such alterations therein and modifications thereof as fairly come within the scope of the invention.

Having fully described my invention, I claim and desire to secure by Letters Patent—

1. A bottle provided with a neck, at the base of which is formed a perforated partition, said neck being adapted to be closed by a plug or stopper, having a central bore formed therein, and a ball suspended below the perforated partition, by means of a cord or wire, which is carried upwardly through said central bore, said bore being adapted to be closed by means of cement or other material, and said partition being provided in its upper surface with a conical depression, and the lower end of the plug or stopper being also conical in form, and the apex thereof, directed downwardly into said conical depression, substantially as shown and described.

2. The combination with a bottle, provided with a plurality of partitions, in the body thereof, which are irregular in form and provided with downwardly-directed extensions at opposite sides, in each of which is formed an opening or passage, and a perforated partition at the bottom of the neck of the bottle, of a plug or stopper adapted to close said neck and provided with a central bore or passage therethrough, and a ball or spherical body in the bottle with which is connected a cord or wire which passes through said perforated partition, and through said central bore in the plug or stopper, substantially as shown and described.

3. The combination with a bottle, provided with a plurality of partitions, in the body thereof, which are irregular in form and provided with downwardly-directed extensions at opposite sides, in each of which is formed an opening or passage, and a perforated partition at the bottom of the neck of the bottle of a plug or stopper adapted to close said neck and provided with a central bore or passage therethrough, and a ball or spherical body in the bottle with which is connected a cord or wire which passes through said perforated partition, and through said central bore in the plug or stopper, said central bore being adapted to be filled with cement or other material, and the bottom of the bottle being provided with an upwardly-directed extension, substantially as shown and described.

4. A bottle provided with a neck, at the base of which is formed a perforated partition, said neck being adapted to be closed by a plug or stopper having a central bore formed therein, and a ball composed of separate parts, and suspended by a cord or wire, which is passed therethrough, and through said perforated partition, and through the central bore of the plug or stopper, substantially as shown and described.

In testimony that I claim the foregoing as my invention I have signed my name, in presence of the subscribing witnesses, this 5th day of October, 1895.

WILLIAM A. HUBENER.

Witnesses:
C. GERST,
K. ENSLIE.